(12) United States Patent
Schneider et al.

(10) Patent No.: US 9,302,589 B2
(45) Date of Patent: Apr. 5, 2016

(54) METHOD AND DEVICE FOR OPERATING A HYBRID VEHICLE IN THE EVENT OF A FAULT IN AN ENERGY SYSTEM

(75) Inventors: Norbert Schneider, Renningen-Malmsheim (DE); Michael Lehner, Wiernsheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 83 days.

(21) Appl. No.: 13/388,859

(22) PCT Filed: Jul. 29, 2010

(86) PCT No.: PCT/EP2010/061056
§ 371 (c)(1),
(2), (4) Date: Apr. 23, 2012

(87) PCT Pub. No.: WO2011/029668
PCT Pub. Date: Mar. 17, 2011

(65) Prior Publication Data
US 2012/0200152 A1    Aug. 9, 2012

(30) Foreign Application Priority Data

Sep. 14, 2009   (DE) .................. 10 2009 029 417

(51) Int. Cl.
| | |
|---|---|
| *B60L 9/00* | (2006.01) |
| *B60L 11/14* | (2006.01) |
| *B60K 6/48* | (2007.10) |
| *B60L 3/00* | (2006.01) |
| *B60L 3/04* | (2006.01) |
| *B60L 11/18* | (2006.01) |

(52) U.S. Cl.
CPC . *B60L 11/14* (2013.01); *B60K 6/48* (2013.01); *B60L 3/0069* (2013.01); *B60L 3/0092* (2013.01);
(Continued)

(58) Field of Classification Search
CPC .... B60W 10/08; B60L 11/14; B60L 11/1868; B60L 3/0069; B60L 3/0092; B60K 6/48
USPC ........................................ 701/22, 45
See application file for complete search history.

(56) References Cited

U.S. PATENT DOCUMENTS 5,705,859 A * 1/1998 Karg et al. ............... 290/45
6,211,681 B1 * 4/2001 Kagawa et al. ........... 324/426
(Continued)

FOREIGN PATENT DOCUMENTS

| | | |
|---|---|---|
| DE | 10213105 | 11/2002 |
| DE | 102008008561 | 8/2009 |

(Continued)

OTHER PUBLICATIONS

International Search Report, PCT International Application No. PCT/EP2010/061056, dated Jan. 24, 2011.

*Primary Examiner* — Behrang Badii
*Assistant Examiner* — Daniel L Greene
(74) *Attorney, Agent, or Firm* — Kenyon & Kenyon LLP

(57) ABSTRACT

A method for operating a hybrid vehicle, the vehicle being driven by at least two power plants, and at least one electric power plant charging a high voltage energy system which supplies a low voltage energy system with electrical energy, a high voltage being converted into a low voltage for supplying at least one control unit of the vehicle, and the vehicle being disconnected from the electric power plant when a fault is detected in the high voltage system. To maintain the energy supply to the control units via the low voltage system even in the event of a fault in the high voltage system, the power plant is placed in a state for generating a voltage which is uncritical for the safety of the user after the high voltage system is disconnected, the safety-uncritical voltage being converted into the low voltage for supplying the at least one control unit.

17 Claims, 3 Drawing Sheets

(52) U.S. Cl.
CPC ............... B60L 3/04 (2013.01); B60L 11/1868 (2013.01); *Y02T 10/6221* (2013.01); *Y02T 10/70* (2013.01); *Y02T 10/7005* (2013.01); *Y02T 10/7066* (2013.01); *Y02T 10/7077* (2013.01)

(56) References Cited

U.S. PATENT DOCUMENTS

| | | | | |
|---|---|---|---|---|
| 6,978,854 | B1* | 12/2005 | Kuang et al. | 180/65.235 |
| 2002/0157882 | A1 | 10/2002 | Kubo et al. | |
| 2004/0052022 | A1* | 3/2004 | Laraia | 361/91.1 |
| 2007/0007939 | A1* | 1/2007 | Miller et al. | 323/299 |
| 2010/0187904 | A1* | 7/2010 | Lucas et al. | 307/10.1 |

FOREIGN PATENT DOCUMENTS

| | | |
|---|---|---|
| JP | 11-4507 | 1/1999 |
| JP | 2003-138958 | 5/2003 |
| JP | 2004-320840 | 11/2004 |
| JP | 2007-28803 | 2/2007 |
| JP | 2007-137299 | 6/2007 |
| JP | 2009-179311 | 8/2009 |
| WO | WO 2008010062 | 1/2008 |

* cited by examiner

METHOD AND DEVICE FOR OPERATING A HYBRID VEHICLE IN THE EVENT OF A FAULT IN AN ENERGY SYSTEM

FIELD OF THE INVENTION

The present invention relates to a method for operating a hybrid vehicle in the event of a fault in an energy system, the hybrid vehicle being driven by at least two power plants, together or separately, and at least one electric power plant electrically charging a high voltage energy system which supplies a low voltage energy system with electrical energy, a high voltage being converted into a low voltage for supplying at least one control unit of the hybrid vehicle; the present invention also relates to a device for carrying out the method.

BACKGROUND INFORMATION

Vehicles which have a hybrid drive structure include an internal combustion engine and usually at least one electric motor as the second power plant. The driving torque may thus be generated by both power plants during operation of the hybrid vehicle. The electric drive is connected to an energy storage which supplies the electric drive with electrical energy. When the internal combustion engine is in recuperation mode, the electric drive operates in generator mode, thereby supplying the energy storage with energy. As a result, the energy storage is recharged with energy.

A high voltage, which is provided by a high voltage battery designed as an energy storage, is required for operating the electric drive. A low voltage energy system is supplied with energy from the high voltage energy system via a DC/DC converter.

In the latest developments, a starter is omitted in the manufacture of the hybrid vehicle, and the internal combustion engine is started with the aid of the electric machine.

The high voltage energy system of the hybrid vehicle is monitored at all times not only for the state of charge of the high voltage battery but also to determine whether a mechanical cover of the high voltage energy system is moved or opened. If this is the case, the high voltage energy system is immediately disconnected for safety reasons to prevent possible sparkover or to protect an operator while manipulating the energy system. Consequently, the electric machine is no longer supplied with high voltage, and the high voltage battery may no longer be recharged. Over time, this drains the battery of the low voltage energy system, which supplies the control units of the hybrid vehicle with energy. If energy is not supplied to the control units, the hybrid vehicle may no longer be operable after a certain amount of time.

SUMMARY

An example method according to the present invention for operating a hybrid vehicle in the event of a fault in an energy system, may have the advantage that the energy supply to the control units via the low voltage energy system is maintained by the electric power plant. Due to the fact that the electric power plant is placed in a state for generating a voltage which is uncritical for the safety of the user after the high voltage energy system is disconnected, the safety-uncritical voltage being converted into the low voltage for supplying the at least one control unit, an emergency operation of the hybrid vehicle is possible at any time even in the event of a fault in the high voltage energy system. The electric machine operating in generator mode is used to provide the energy for the low voltage energy system, whereby sufficient energy is generated even in the event of a fault in the high voltage energy system to maintain the operational readiness of all control units needed for operating the hybrid vehicle even in this state.

The high voltage-carrying components, in particular the mechanical cover thereof, are advantageously monitored to detect a fault in the high voltage energy system. Continuous monitoring of the mechanical cover, which is also referred to as "cover open detection," makes it possible to quickly and reliably detect a fault in the high voltage energy system. Even the slightest deviation causes the high voltage energy system to be disconnected so as not to endanger the driver and vehicle. Nevertheless, a sufficient amount of energy is always provided by the example method according to the present invention to reliably prevent the hybrid vehicle from breaking down.

In one refinement, the communication connections to the high voltage energy system, in particular a bus connection, are monitored for the purpose of detecting a fault in the high voltage energy system. An interruption in the communication connections to or within the high voltage energy system is reliably detected thereby, and the electric machine is reliably started as the energy supplier of the low voltage energy system in the event that the high voltage energy system is subsequently disconnected.

In one embodiment, the voltage which is uncritical for the safety of the operator is approximately 60 V. This ensures that a risk of injury to the driver, who may be working on the system of the electric machine or its surroundings, is prevented.

The electric power plant is advantageously designed as an electric motor which is switched from a torque-regulated mode to a voltage-regulated mode. This voltage regulation ensures that the safety-uncritical voltage value of approximately 60 V is maintained continuously to guarantee the supply of the low voltage energy system.

In one embodiment, the control units which are responsible for comfortable operation of the hybrid vehicle are disconnected when the fault in the high voltage energy system is detected. This ensures that all of the control units needed for operating the hybrid vehicle are reliably supplied with energy. Control units for comfortable operation, for example control units for power windows, the air conditioner or the rear window heater, do not place a load on the low voltage energy system until the high voltage energy system, from which a voltage of 300 V is provided and which is converted into the low voltage of 14 V, is again ready for operation.

Another refinement of the present invention relates to a device for operating a hybrid vehicle in the event of a fault in an energy system, the hybrid vehicle being driven by at least two power plants, together or separately, and at least one electric power plant electrically charging the high voltage energy system, which supplies a low voltage energy system with electrical energy, a high voltage being converted into a low voltage for supplying at least one control unit of the hybrid vehicle, and the hybrid vehicle being disconnected from the electric power plant in the event that a fault in the high voltage energy system is detected. To maintain the energy supply to the control units via the low voltage energy system even in the event of a fault in the high voltage energy system, an arrangement is provided which places the electric power plant in a state for generating a voltage which is uncritical for the safety of the user after the high voltage energy system is disconnected, the safety-uncritical voltage being converted into the low voltage for supplying the at least one control unit. Due to the fact that the electric machine generates a safety-uncritical voltage from which sufficient energy may be supplied to the low voltage energy system, an emergency operation of the hybrid vehicle is possible at any time, since the control units needed for the driving operation are sufficiently supplied with energy.

The electric power plant is advantageously connected to a switching device via a pulse inverter, the switching device connecting the high voltage energy system to the electric power plant in the intact operating state of the high voltage energy system and interrupting the connection in the event of a fault in the high voltage energy system. With the aid of a simple switching device which is activated by a control unit for high voltage battery management when a fault is detected in the high voltage energy system, it is possible to easily decouple the defective high voltage energy system from the power supply network of the hybrid vehicle without a great deal of design complexity or cost expenditure.

In one embodiment, a DC/DC converter leads to the switching device and the pulse inverter, on the one hand, and is connected to the low voltage energy system, on the other hand. The DC/DC converter is a converter which converts a direct voltage of a first absolute value into a direct voltage of a second absolute value.

In one refinement, the DC/DC converter is switchable between a first operating mode for converting a high voltage into a low voltage and a second operating mode for converting the safety-uncritical voltage into the low voltage. A slight modification of the DC/DC converter is thus sufficient to ensure operation in both modes. Additional components may therefore be omitted.

The pulse inverter is advantageously designed in such a way that it is able to convert voltages present thereat in both directions. The pulse inverter thus converts the alternating voltage provided by the electric power plant into a direct voltage for feeding into the high voltage energy system and vice versa. The pulse inverter is a component which is already present per se in the electrical system of the hybrid vehicle and which is also used for continuous emergency operation of the hybrid vehicle without additional components having to be provided.

In one embodiment, the electric power plant is designed as an electric motor which is switched by an electric motor control unit from a torque-regulated operating mode to a voltage-regulated operating mode for providing the safety-uncritical voltage when a fault is reported by a battery management control unit which monitors the high voltage energy system, in particular a high voltage battery. The electric motor thus operates as an energy source for the low voltage vehicle electrical system in such a way that continuous movement of the hybrid vehicle is possible.

In one refinement, the low voltage energy system includes a low voltage battery which is supplied with low voltage via the DC/DC converter and which supplies the control units with low voltage via a low voltage vehicle electrical system. The low voltage battery is continuously charged to a direct voltage of 14 V, which is necessary for supplying the control units of the hybrid vehicle.

The present invention permits numerous specific embodiments. One of these specific embodiments is explained in greater detail on the basis of the figures.

BRIEF DESCRIPTION OF THE DRAWINGS

The same features are identified by the same reference numerals.

DETAILED DESCRIPTION OF EXAMPLE EMBODIMENTS

Figure 1:
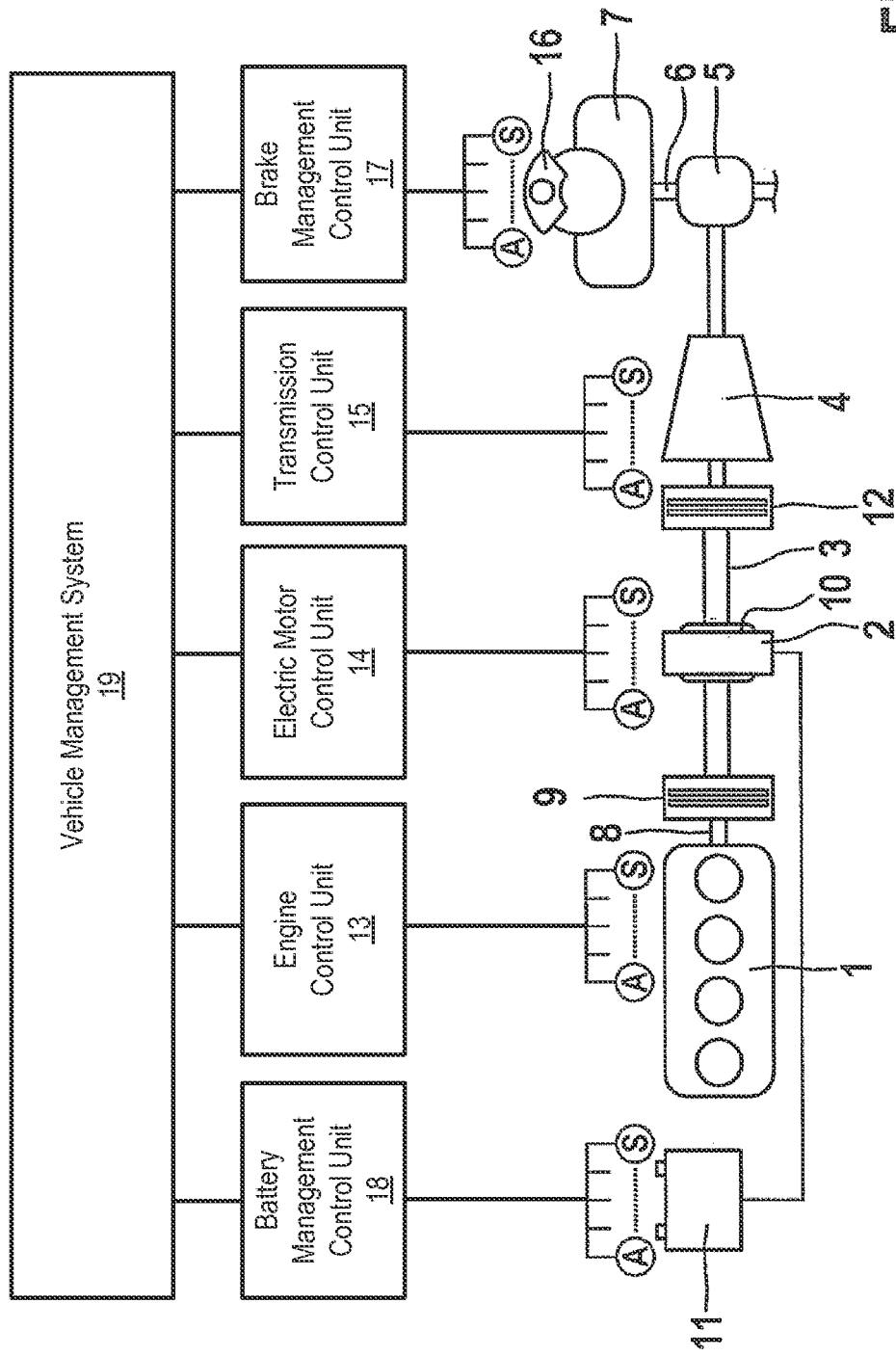
FIG. 1 shows a schematic representation of a parallel hybrid drive.

FIG. 1 shows a schematic representation of a vehicle which has a parallel hybrid drive. The hybrid drive is formed by an internal combustion engine 1 as the first drive unit and an electric motor 2 as the second drive unit.

Internal combustion engine 1 is connected via drive train 3 to transmission 4, which, in turn, leads to wheel axle 6 for driving wheel 7 via differential gear 5.

Electric motor 2 is situated on shaft 8 of internal combustion engine 1 and thus also leads to drive train 3, which is connected to transmission 4. A starting clutch 12, which connects drive train 3 to the transmission for starting the vehicle movement of the vehicle, is situated between transmission 4 and drive train 3. Electric motor 2 thus contributes to the driving of wheels 7 and to the total torque of the vehicle. Electric motor 2 and internal combustion engine 1 are connected to each other via a separating clutch 9. In the disengaged state, this separating clutch 9 enables the vehicle to be driven solely via electric motor 2, while in the engaged state of separating clutch 9, both internal combustion engine 1 and electric motor 2 contribute to the driving of the vehicle.

In addition, electric motor 2 is connected via power electronics 10 to a high voltage battery 11, which supplies electric motor 2 with electrical energy in the motor-driven mode thereof. Alternatively, high-voltage battery 11 is supplied with energy from electric motor 2 in the generator mode of electric motor 2. This means that high-voltage battery 11 is charged via electric motor 2.

Each power plant of the hybrid drive is controlled or regulated via a control unit. Internal combustion engine 1 is thus monitored by an engine control unit 13, while electric motor 2 is controlled by an electric motor control unit 14. A transmission control unit 15 monitors starting clutch 12 and transmission 4, while brake 16, which is situated on wheels 7, is actuated by a brake management control unit 17. High voltage battery 11 and the high voltage energy system of the hybrid vehicle connected thereto are also monitored and controlled by a battery management control unit 18. Engine control unit 13, electric motor control unit 14, transmission control unit 15, brake management control unit 17 and battery management control unit 18 are each connected to sensors S which detect the actual states of power plants 1, 2, 3, 4, 7, 11, 12, and to actuators A for actuating power plants 1, 2, 3, 4, 7, 11, 12, and these control units lead to a vehicle control system 19 which coordinates the processes in the individual power plants, such as internal combustion engine 1, electric motor 2, transmission 4, wheel 7, high voltage battery 11 and starting clutch 12.

A high voltage, which is provided by high voltage battery 11, is required for operating electric motor 2. The high voltage is approximately 300 V and is converted into a low voltage of 14 V, which will be explained in connection with FIG. 2.

Figure 2:
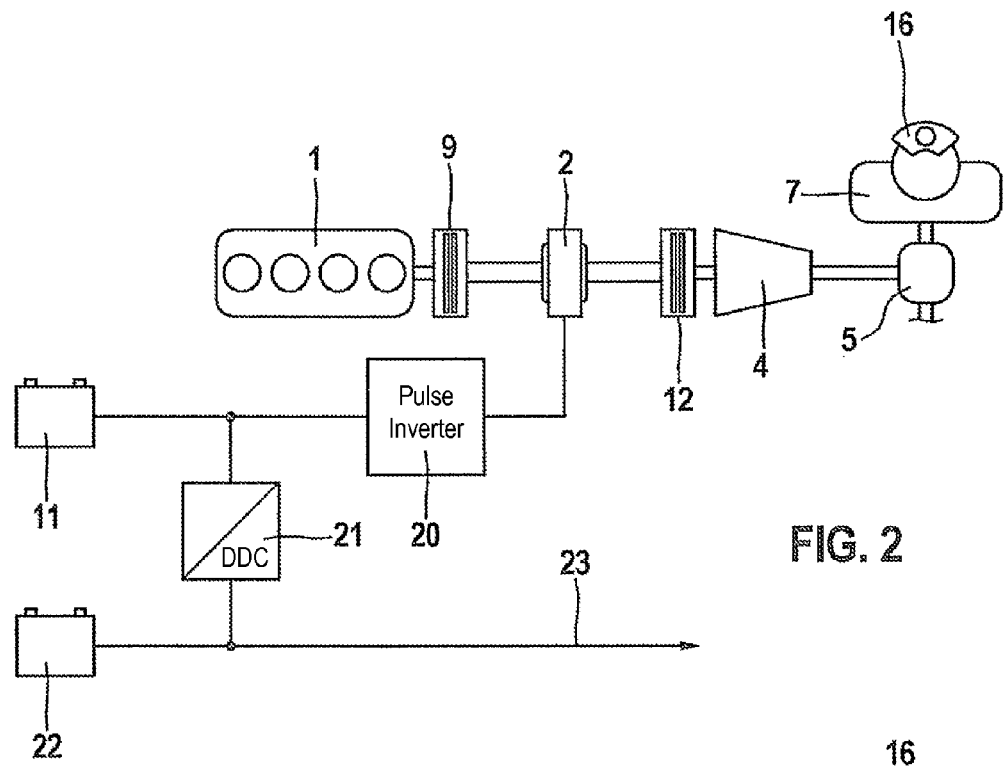
FIG. 2 shows the conventional integration of the hybrid drive into the energy system.

FIG. 2 shows the conventional integration of the hybrid drive into the energy system of the hybrid vehicle. Electric motor 2 is connected to high voltage battery 11 via a pulse inverter 20. Pulse inverter 20 converts the 300 V direct voltage provided by high voltage battery 11 into an alternating voltage, which is supplied to electric motor 2 for the motor-driven operation thereof. In this operating mode, electric motor 2 contributes to the driving of the hybrid vehicle. If electric motor 2 is switched to generator mode by electric motor control unit 14, which is the case during a braking operation of the hybrid vehicle, electric motor 2 supplies an alternating voltage which is converted back into a direct voltage via pulse inverter 20 and supplied to high voltage battery 11 for the purpose of charging the high voltage battery.

Both high voltage battery 11 and pulse inverter 20 are connected to a DC/DC converter 21 which converts the 300 V direct voltage supplied by high voltage battery 11 into a low direct voltage of approximately 14 V for the purpose of charging a low voltage battery 22 which is situated in the low voltage energy system of the hybrid vehicle and which supplies all control units of the hybrid vehicle with low voltage via a vehicle electrical system 23. In addition to control units which control the comfort functions of the vehicle, and which are not illustrated in further detail, this also includes engine control unit 13, electric motor control unit 14, transmission control unit 15, brake management control unit 17 and battery management control unit 18, which are illustrated in FIG. 1.

Figure 3:
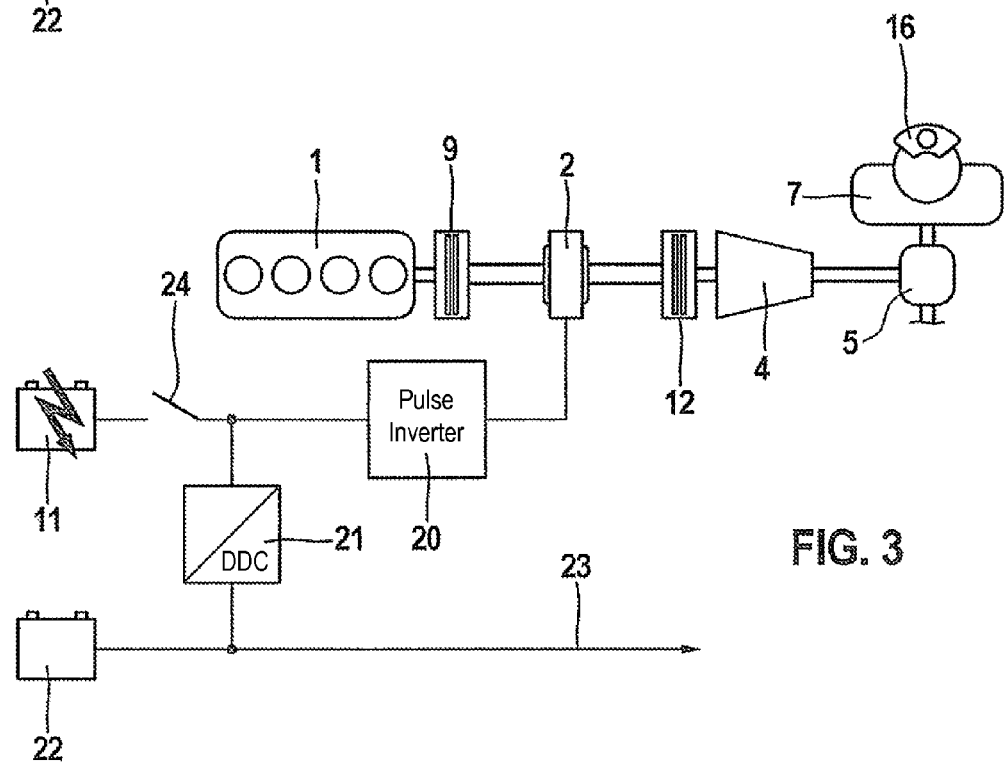
FIG. 3 shows an exemplary embodiment of the design according to the present invention of the energy system according to FIG. 2.

If, during a "cover open detection," which is absolutely necessary for safety reasons, specifically to protect against high voltage, it is determined that a fault has occurred in the high voltage energy system, a switch 24, which is situated between high voltage battery 11 and pulse inverter 20, is opened, as illustrated in FIG. 3, and high voltage battery 11 is decoupled from the energy system of the hybrid vehicle. In this case, no more voltage is provided for the low voltage energy system. However, to maintain the power supply of the control units required for the driving operation, such as engine control unit 13, electric motor control unit 14, transmission control unit 15, brake management control unit 17 and battery management control unit 18, at a low voltage, electric motor 2 is now used as the energy source. Electric motor 2 operates in generator mode and provides an alternating voltage of 60 V, which is converted into a direct voltage of 60 V by pulse inverter 20. Since switch 24 is open, the 60 V direct voltage is present at DC/DC converter 21. This DC/DC converter 21 is designed in such a way that, in addition to transforming the 300 V provided by high voltage battery 11, it is also able to convert the 60 V supplied by electric motor 2 and pulse inverter 20 into a low voltage of 14 V. This low voltage of 14 V is used to charge low voltage battery 22.

The voltage which is supplied by electric motor 2 is limited to 60 V. It is thus uncritical, and endangerment of the person working on the energy system of the hybrid vehicle is ruled out.

Figure 4:
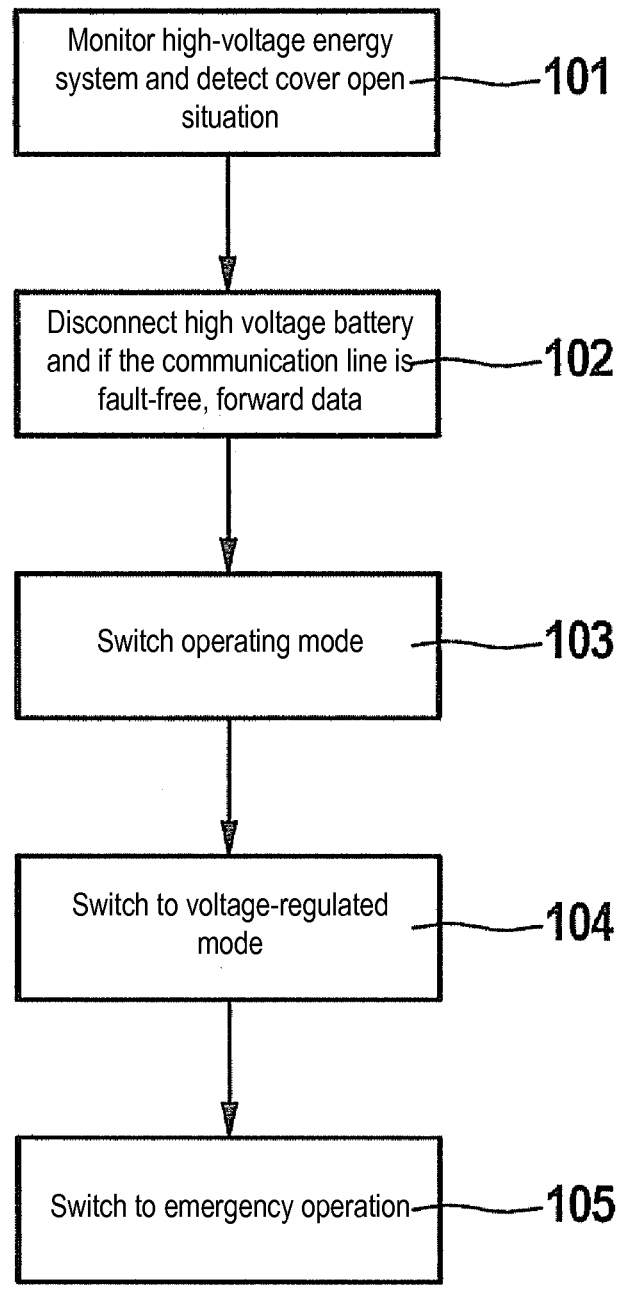
FIG. 4 shows a schematic flow chart for carrying out the example method according to the present invention.

The sequence for configuring the auxiliary energy supply for control units 13, 14, 15, 17, 18 of the hybrid vehicle is explained in greater detail with the aid of FIG. 4. In block 101, battery management control unit 18 monitors the high voltage energy system of the hybrid vehicle. Not only the state of charge of high voltage battery 11 but also the communication system, which is designed as a CAN bus system, is monitored for interruption to the high voltage battery system. In addition, the cover of the high voltage battery system is checked, which is also known as a "cover open detection," for the purpose of detecting even the slightest irregularities, which may result in faults in the high voltage energy system and which may jeopardize the safety of the hybrid vehicle.

If a fault is detected by battery management control unit 18, this unit disconnects the high voltage battery in block 102 and opens switch 24 between high voltage battery 11 and pulse inverter 20, as illustrated in FIG. 3. In addition, battery management control unit 18 forwards an item of information about the fault in the high voltage energy system to vehicle management system 19 in the event of a fault-free communication line. If the communication line has a fault, this fault is detected by vehicle management system 19.

At the instigation of the battery management system, DC/DC converter 21 is switched from operating mode "transformation 300 V→14 V" to operating mode "Transformation 60 V→14 V" in block 103.

In block 104, vehicle management system 19 outputs a command to electric motor control unit 14 to switch electric motor 2 from torque-regulated mode, in which electric motor 2 is operating, to a voltage-regulated mode, if electric motor 2 is contributing to the driving of the vehicle. In this voltage-regulated mode, a regulation to a safety-uncritical target voltage of 60 V is carried out, which is then available for conversion into the low voltage of 14 V. In block 105, the hybrid vehicle may be permanently switched to emergency operation, in which it may continue to operate without a high voltage, even if the high voltage energy system of the hybrid vehicle fails, due to the provision of the 14 V voltage.

What is claimed is:

1. A method for operating a hybrid vehicle in the event of a fault in an energy system, the method comprising:
    placing at least one electric power plant in a state for generating a voltage which is uncritical for safety of a user after a high voltage energy system is disconnected, wherein the hybrid vehicle is driven by at least two power plants, together or separately, and the at least one electric power plant electrically charging a high voltage energy system which supplies a low voltage energy system with electrical energy, a high voltage being converted into a low voltage for supplying at least one control unit of the hybrid vehicle, and the hybrid vehicle being disconnected from the electric power plant when a fault is detected in the high voltage energy system; and
    converting the safety-uncritical voltage into the low voltage for supplying the at least one control unit;
    wherein the electric power plant is an electric motor which is switched from a torque-regulated mode to a voltage-regulated mode.

2. The method as recited in claim 1, wherein a bus connection to the high voltage energy system is monitored to detect a fault in the high voltage energy system.

3. The method as recited in claim 1, wherein the voltage which is uncritical for the safety of the user is approximately 60 V.

4. The method as recited in claim 1, wherein control units which are responsible for comfortable operation of the hybrid vehicle are disconnected after the fault in the high voltage energy system is detected.

5. The method as recited in claim 1, wherein a high voltage-carrying component is monitored for detecting a fault in the high voltage energy system.

6. The method as recited in claim 5, wherein the high voltage-carrying component includes a mechanical cover.

7. The method as recited in claim 1, wherein a high voltage-carrying component is monitored for detecting a fault in the high voltage energy system, wherein the high voltage-carrying component includes a mechanical cover, and wherein a bus connection to the high voltage energy system is monitored to detect a fault in the high voltage energy system.

8. The method as recited in claim 7, wherein the electric power plant is an electric motor which is switched from a torque-regulated mode to a voltage-regulated mode, and wherein control units which are responsible for comfortable operation of the hybrid vehicle are disconnected after the fault in the high voltage energy system is detected.

9. The method as recited in claim 7, wherein the voltage which is uncritical for the safety of the user is approximately 60 V.

10. The method as recited in claim 9, wherein the electric power plant is an electric motor which is switched from a torque-regulated mode to a voltage-regulated mode, and wherein control units which are responsible for comfortable operation of the hybrid vehicle are disconnected after the fault in the high voltage energy system is detected.

11. A device for operating a hybrid vehicle in the event of a fault in an energy system, the device comprising:
an arrangement to place at least one electric power plant in a state for generating a voltage which is uncritical for the safety of a user after a high voltage energy system is disconnected, and converting the safety-uncritical voltage into the low voltage for supplying the at least one control unit;
wherein the hybrid vehicle is driven by at least two power plants, together or separately, and the at least one electric power plant electrically charging the high voltage energy system, which supplies a low voltage energy system with electrical energy, a high voltage being converted into a low voltage for supplying at least one control unit of the hybrid vehicle, and the hybrid vehicle being disconnected from the electric power plant when a fault is detected in the high voltage energy system;
wherein the electric power plant is an electric motor which is switched from a torque-regulated mode to a voltage-regulated mode.

12. The device as recited in claim 11, wherein the electric power plant is connected via a pulse inverter to a switching device which connects the high voltage energy system to the electric power plant in an intact operating state of the high voltage energy system and which interrupts the connection in the event of a fault in the high voltage energy system.

13. The device as recited in claim 12, wherein the electric power plant is an electric motor which is switched by an electric motor control unit from the torque-regulated operating mode to the voltage-regulated operating mode for providing the safety-uncritical voltage when a fault is reported by a battery management control unit which monitors the high voltage energy system, the high voltage energy steps including a high voltage battery.

14. The device as recited in claim 12, wherein the low voltage energy system includes a low voltage battery which is supplied with low voltage via the DC/DC converter and which supplies the control units with low voltage via a vehicle electrical system.

15. The device as recited in claim 12, wherein a DC/DC converter leads to the switching device and the pulse inverter, on the one hand, and is connected to the low voltage energy system, on the other hand.

16. The device as recited in claim 15, wherein the DC/DC converter is switchable between a first operating mode for converting a high voltage into a low voltage and a second operating mode for converting the safety-uncritical voltage into the low voltage.

17. The device as recited in claim 15, wherein the pulse inverter is configured to convert voltages present thereat in both directions.

* * * * *